United States Patent [19]
McDonald

[11] Patent Number: 5,272,549
[45] Date of Patent: Dec. 21, 1993

[54] APPARATUS FOR ELECTRONIC EDITING OF INTEGRATED COLOR IMAGES WITH RELATED TEXT MATERIAL AND EMPLOYING AN IMAGE FRAME

[76] Inventor: Bruce A. McDonald, 14807 N. 73rd St., #103, Scottsdale, Ariz. 85260

[21] Appl. No.: 786,705

[22] Filed: Nov. 1, 1991

[51] Int. Cl.⁵ ............................................. H04N 1/46
[52] U.S. Cl. ..................................... 358/527; 358/537
[58] Field of Search .................. 358/75, 76, 400, 450, 358/452, 402, 403; 379/93, 96-98, 100; 395/146, 147

[56] References Cited

U.S. PATENT DOCUMENTS

| | | | |
|---|---|---|---|
| 4,689,669 | 8/1987 | Hoshino et al. | 358/76 |
| 5,003,405 | 3/1991 | Wulforst | 358/400 |
| 5,047,864 | 9/1991 | Fujito | 358/76 |
| 5,048,078 | 9/1991 | Satomi et al. | 379/100 |
| 5,113,249 | 5/1992 | Yosefi | 358/75 |
| 5,181,124 | 1/1993 | Close et al. | 358/75 |

*Primary Examiner*—Stephen Brinich
*Attorney, Agent, or Firm*—Warren F. B. Lindsley

[57] ABSTRACT

Method and apparatus for incorporating high resolution color images in a document wherein edited text material and an image frame are transmitted over telephone lines from a personal computer to a telecommunication processor at a copy center which processor adds stored color images to the integrated text material and causes the document to be printed by a color laser copier or printer at the copy center.

9 Claims, 1 Drawing Sheet

APPARATUS FOR ELECTRONIC EDITING OF INTEGRATED COLOR IMAGES WITH RELATED TEXT MATERIAL AND EMPLOYING AN IMAGE FRAME

BACKGROUND OF THE INVENTION

This invention relates to electronic editing and more particularly to editing of integrated color images and related text material of a document over telephone lines connecting a customer with a copy center.

Production of high quality color brochures and other color documents containing text material requires the ability to edit the text material and then integrate it with color images followed by printing of the integrated document without loss of color resolution. Printers capable of producing high quality color printed images are expensive and are usually not affordable by individuals and small businesses who typically rely on printers at a copy center for their printing needs.

By sharing an expensive, high quality color laser copier among many personal computer users, the cost to produce high quality color printouts can be lowered to levels affordable by most individuals and small businesses.

Sharing a color printer can be accomplished by a user visiting a print center with text material and color images which then may be scanned at the print center for color laser printing purposes. Alternatively the color copier or printer may be accessed remotely.

Remote access to the color laser copier or printer can be accomplished by telephone but this can result in substantial transmission costs since transmitting uncompressed color images over telephone lines requires sending millions of bytes of image data over lines having limited transmission capacity. Typically, a color image can require several million bytes of pixel information to accurately represent the image. Commercial phone lines can transmit information at data rates up to a few thousand bytes per second by means of conventional MODEM (modulator demodulator) technology. Hence, a color image containing ten million bytes of pixel information will require ten thousand seconds if a 9600 band MODEM is utilized. This results in almost three hours of transmission time per image. This invention provides the means of reducing their transmission time by a factor of one hundred by means of data compression.

In the present invention, the text of a document may be edited and moved on its sheet or sheets of paper by telephone transmission without the need of color image transmission and when the document is fixed it may be printed by a color laser copier or printer with high resolution.

Two means for reducing printing and transmission costs by telephone transmission and subsequent printing of the document at the local print center comprise:

1. Compressing the color image prior to telephone transmission followed by decompression of the image at the shared printer; and 2. Physically transferring color images to the copy center (hand carry, mail, etc.) for scanning followed by telephone transmission of text material to be integrated with the scanned color image at the copy center.

The advantage of the first solution is that the integration of text material and color image can be done completely at the user's location without requiring the additional step of physically transferring a separate color image to the copy center. The disadvantage of this approach is that data compression at levels sufficient to significantly reduce transmission time may introduce distortion in the color image thereby reducing the quality of the printed output.

The advantages of the second solution, i.e., the physical transfer of the full color image to the print center uncompressed or partially compressed is that the resulting document incorporating both text material and color images has maximum fidelity since distortion introduced by data compression can be minimized or totally eliminated. The disadvantage of this solution is that the integration of the text material and the color images would normally be extremely difficult if not impossible to obtain since the integration process is performed by the user on his personal computer which is remote from the copy center.

A solution which produces the lowest cost, highest quality integration of text material and color image, while preserving user convenience inherent in remote text editing, is the technology of electronic mirror editing disclosed and claimed herein.

SUMMARY OF THE INVENTION

In accordance with the invention claimed, a new and improved method and apparatus for the preparation of a document comprising text material, integrated with color images, is disclosed. Such documents may be printed with a color laser copier or printer having high resolution print capabilities at reasonable costs.

It is, therefore, one object of this invention to provide a new and improved method and apparatus for integrating edited text material with given color images on a color laser copier or printer.

Another object of this invention is to provide a new and improved apparatus for printing a document comprising color images with text material which is edited at the user's computer terminal one or more times, and then transmitted to a color laser copier or printer over telephone lines where it is integrated with color images and then printed by a high resolution color laser copier or printer.

Another object of this invention is to provide apparatus for printing a document wherein an image frame and related text material are transmitted by a user to and from a copy center with the color images placed within the image frame integrated with text material by the copy center prior to printing at the copy center by its color laser copier or printer.

A further understanding of the nature and advantages of the present invention will be gained by reference to the following portions of the specifications and the appended drawings.

DESCRIPTION OF THE PREFERRED EMBODIMENT

Figure 1:
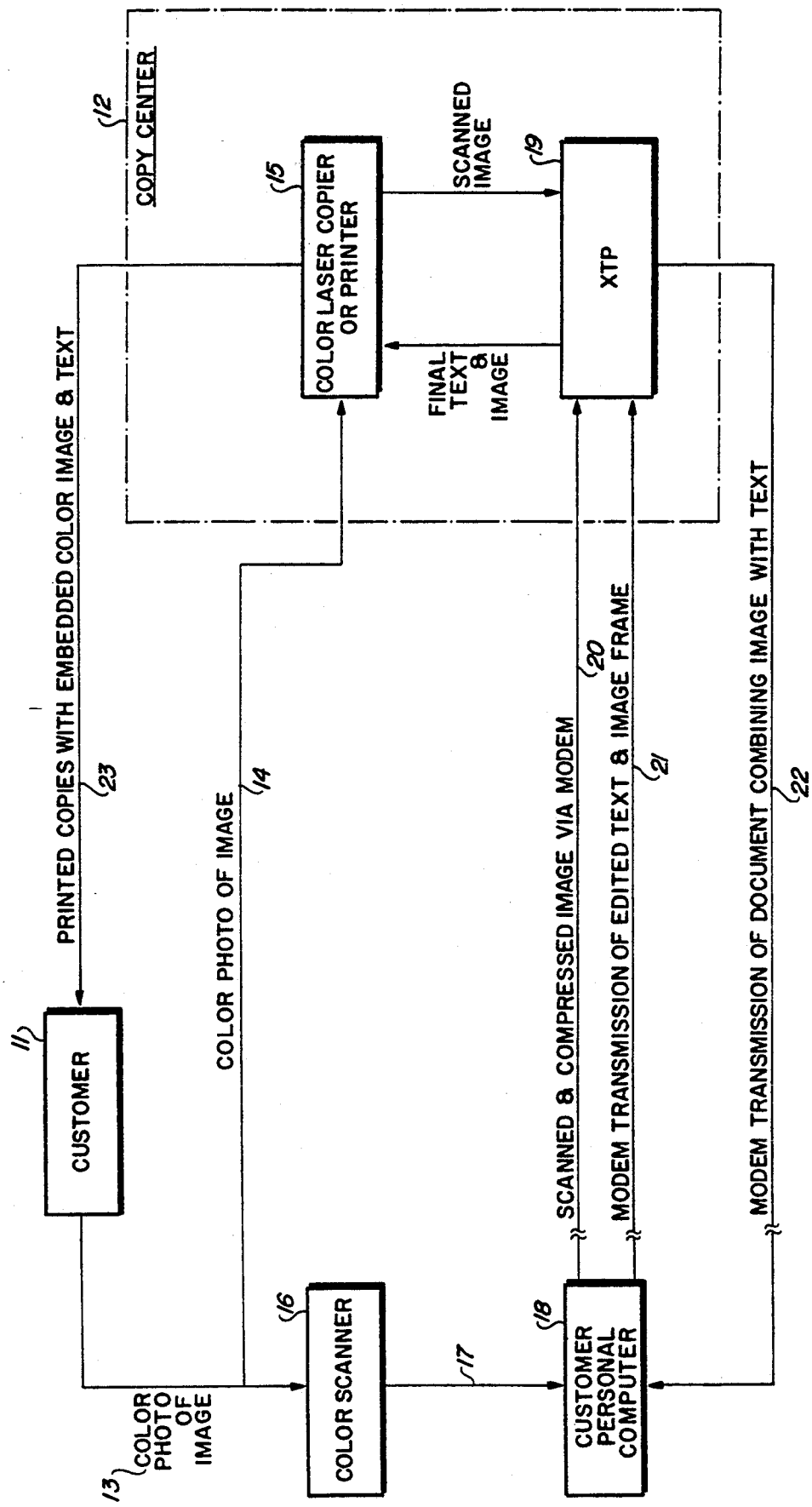
FIG. 1 is a block diagram of a document editing system for text material that is integrated with a color image at a copy center and then printed with a color laser copier or printer.

In the technique of electronic mirror editing (EME), a color image to be incorporated into a printed document is first scanned using a color scanner having a minimum resolution of three hundred dots per inch (DPI). This scanning process can be done by either a customer using a color scanner connected to his or her personal computer (PC) or at the remote print or copy center using its color scanner which may be an integral part of a color laser copier. If the color scanning is done at the copy center, the color images or photos to be scanned must be forwarded to the copy center by the customer for scanning purposes. The copy center's telecommunication processor (XTP) can be accessed by the user to retrieve a full color version of the image via MODEM, for review and storage in the user's PC. If the color scanning is performed by the customer, then the customer must first scan the image to be printed, store the image on a removable electronic storage media, such as a magnetic or optical diskette and then he or she must forward the storage media to the copy center where the image is then copied into the copy center's telecommunication processor.

It should be noted that the telecommunication processor (XTP) is a 80386 micro computer containing magnetic storage devices, color display terminal, keyboard, MODEM, desk top publishing software, Xedac's telecommunication software required to receive, edit and transmit images and text to and from the customer's remote PC and transfer the documents ready for printing to the color laser copier or color printer.

Once the user's color image or images are stored in the copy center's telecommunication processor (XTP), the customer then generates on his personal computer the text material to be incorporated with the color image. The customer then electronically connects his personal computer to the copy center's telecommunication processor (XTP) by means of a modulator demodulator (MODEM) card. Both the customer's personal computer and the telecommunication processor contain a MODEM so that both computers can communicate with one another over an ordinary telephone line.

The user or customer, in creating the page layout of the document to be printed, dials the telecommunication processor at the copy center and requests that a compressed version of a particular color image stored on a disk within the telecommunication processor be sent to his personal computer via the MODEM telephone connection. Once received at the customer's personal computer, the color image can be positioned on the page layout, cropped, stretched or otherwise modified. Text material can be added on the same page of the document utilizing any number of software applications for desktop publishing. The final page layout, with an image frame but without the actual image, is then transmitted over the telephone lines back to the telecommunication processor at the copy center. After placing the image within the image frame, the telecommunication processor returns the edited page with the full color image and text to the user via the telephone MODEM for a final confirmation. Once confirmed, the page layout, which includes one or more full color images, along with text material, is ready for printing on the copy center's color laser copier or printer.

Each page of the document to be printed is prepared in this way with back and forth transmission of an image frame and text material between the user and the telecommunication processor at the copy center as frequently as necessary.

Since the editing function normally requires only positioning and cropping, low resolution editing versions are used to speed the transmission and editing process. This ability to perform real time online editing of the page layout is dubbed "electronic mirror editing."

The actual printing of the document occurs at high resolution (400 dpi) at the copy center once the user has released the document for production.

In summary, the disclosed system offers the convenience of low cost, fast remote telephone editing while retaining a high level of color image and text quality in the printed copy.

FIG. 1 discloses a block diagram of the above disclosure wherein a customer 11 can request a copy center 12 to print a color document. The customer delivers a color photo 13 via a suitable transmission mode 14 to a copy center 12. The color image or photo 13 of customer 11 also may be scanned by its color scanner 16 and transmitted via line 17 to the customer's personal computer 18 which then may transmit a scanned and compressed image of the photo via MODEM to the telecommunication processor XTP 19 of the copy center via line 20. The copy center's telecommunication processor 19 returns its mockup of the text material and layout of the color image back to the customer's computer 18 over telephone lines 22.

Each page of a printed document is prepared this way with back and forth transmission of an image frame, a low DPI version of the image to be contained in the image frame, and text material between the user and the telecommunication processor 19 at the copy center as frequently as necessary.

Continued changes by the customer and the return of further mock-ups may continue over the telephone lines 21 and 22 by the customer and copy center until the document is approved by the customer after which the approved mock-up is printed by the color laser copier 15 with the color image storaged at the copy center. The color image is of a high resolution since it did not suffer any loss of sharpness due to telephone line transmission.

The full colored document printed by color laser copier or printer 15 is then delivered to customer 11 as evident by line 23 of FIG. 1

It should be noted that the drawing illustrates a plurality of telephone lines used to implement the novel hardware and functions disclosed. However, only one telephone line may be used to fully implement the disclosed invention, if so desired, and still fall within the scope of the claimed invention.

The invention has now been described with reference to a specific embodiment. Various modifications and substitutions will be apparent to persons skilled in the relevant arts. Accordingly, it is not intended that the invention be limited to the specific embodiment described herein, but is defined by the appended claims.

What is claimed is:

1. A system for electronically editing and printing a document containing text and color images comprising the steps of:

transmitting a color image to a copy center having a telecommunications processor and a color copier or printer for storage in said telecommunications processor, transmitting by personal computer text material and an image frame for the color image over a telephone line to said telecommunications processor at said copy center, transmitting by said telecommunications processor a first compressed mock-up of said text material and color image in said image frame over said telephone line to said personal computer for editing purposes, transmitting approval of said first mock-up by said personal computer over said telephone line to said telecommunications processor, and printing said document comprising said text material integrated with said color image in said telecommunications processor by said color copier or printer of said copy center.

2. The system set forth in claim 1 wherein:

said color image received by said copy center comprises a photograph.

3. The system set forth in claim 1 wherein:

said color image comprises a scanned image on a magnetic disk or optical storage device.

4. The system set forth in claim 1 wherein:

said document comprises text surrounding said image frame.

5. An apparatus for electronically editing and printing a color document comprising:

a copy center comprising a telecommunications processor and a color copier or printer, a personal computer terminal spaced from said copy center, a color image placed in said telecommunications processor, a telephone line means interconnecting said telecommunications processor with said personal computer for transmitting text material and an image frame from said personal computer to said telecommunications processor, a telephone line means interconnecting said processor with said personal computer for transmitting a mock-up of said material and a compressed copy of said color image arranged in said image frame to said personal computer for approval purposes, means for transmitting instruction regarding said mock-up to said copy center over said telephone line means, and means for causing said color copier or printer to print said text material integrated with said color image stored in said telecommunications processor.

6. The apparatus set forth in claim 5 wherein:

said scanned color image is transmitted to said processor by said personal computer terminal.

7. An apparatus for electronically editing and printing a document comprising:

a telecommunication processor, a color copier or printer, a personal computer spaced from said telecommunication processor and said color laser copier or printer, a first means for transmitting a color image to said telecommunication processor and storing it therein, telephone line means including a modulator and demodulator for transmitting text material and an image frame between said personal computer and said telecommunication processor for editing purposes, said telecommunication processor integrating said color image positioned in said image frame with said text material, and a second means for causing said color copier or printer to print the integrated color image and said text material.

8. The apparatus set forth in claim 7 wherein:

said first means comprises a scanned color image transmitted to said telecommunication processor by said personal computer.

9. The apparatus set forth in claim 7 wherein:

said first means comprises said telephone line means.

* * * * *